Figure 1:
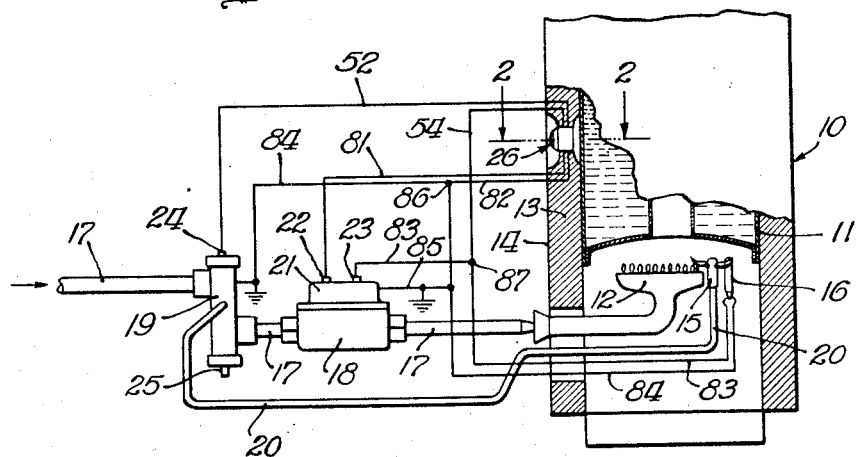

March 24, 1959 A. J. HILGERT 2,879,358
FLUID FUEL CONTROL APPARATUS
Filed April 29, 1953 2 Sheets-Sheet 1

INVENTOR.
Adolph J. Hilgert
Russell B. Matthews.
By
Attys.

March 24, 1959   A. J. HILGERT   2,879,358
FLUID FUEL CONTROL APPARATUS
Filed April 29, 1953   2 Sheets-Sheet 2

INVENTOR.
Adolph J. Hilgert
Russell B. Matthews.
By
Brown, Jackson, Boettcher & Dienner
Attys.

United States Patent Office 2,879,358
Patented Mar. 24, 1959

2,879,358

FLUID FUEL CONTROL APPARATUS

Adolph J. Hilgert, Milwaukee, Wis., assignor to Baso Inc., Milwaukee, Wis., a corporation of Wisconsin Application April 29, 1953, Serial No. 351,948

14 Claims. (Cl. 200—140)

This invention relates to improvements in fluid fuel control apparatus, and more particularly to temperature responsive thermoelectrically powered apparatus which is adapted to control the flow of fuel to the main and pilot burners of a fuel fluid burning water heater or the like, said control apparatus including a circuit controlling device of novel construction.

It has been standard practice in the past to utilize immersion type temperature responsive control devices in apparatus for controlling the flow of fuel to equipment, for example to water heaters, having tanks for the storage of heated liquid. The surface type temperature responsive control devices heretofore developed have been unsatisfactory because they could not follow the water temperature fast enough and accurately enough to avoid undesirably high fluctuations in water temperature. Immersion type temperature responsive devices, by reason of the fact that they project into a tank and into actual contact with the liquid therein, present installation and operaional problems not presented by surface type devices. However, the greater sensitivity of the immersion type devices, as compared with that of the heretofore available surface type devices, has, until now, warranted the use of the immersion type device.

It is a general object of the present invention to provide an improved thermoelectrically powered fluid fuel control apparatus which includes a surface type temperature responsive circuit controlling device of novel construction, said device providing greater sensitivity than conventional immersion type circuit controlling devices.

A more specific object of the invention is to provide an improved surface type circuit controlling device in which substantially all mechanical contributions to the temperature differential thereof have been eliminated, so that the temperature differential of the device is determined by the thermal lag therein, thereby providing highly sensitive operation.

Another object of the invention is to provide an improved apparatus of the character described wherein the improved temperature responsive circuit controlling device includes a set of temperature control contacts connected in circuit with an electromagnetically operated cycling type main burner fuel control valve, said device also including a set of high limit contacts operable independently of said temperature control contacts and connected in circuit with a manually resettable electromagnetically operated safety shut-off valve to provide 100 percent shut-off of the fuel in response to temperatures in excess of the high limit setting of said high-limit contacts.

A further object of the invention is to provide an improved apparatus of the class described which is powered by a single pilot-controlled thermoelectric generator, extinguishment of the pilot flame causing closure of both the cycling and the safety shut-off valve to provide 100 percent shut-off of the fuel.

Another object of the invention is to provide in an apparatus of the class described a temperature responsive circuit controlling device which is so constructed that when the high limit contacts thereof interrupt the circuit or "drop out" in response to high limit temperatures, said contacts cannot return automatically to circuit making position in response to subsequent lower temperatures, but must be reset to said position, said device being provided with a displaceable member which serves the dual functions of a drop-out indicator and a manually actuable contact resetting means.

Another object of the invention is to provide an improved temperature responsive circuit controlling device of the class described wherein the set of temperature control contacts and the set of high limit contacts are each encapsulated within a separate enclosure, said enclosures being provided with a common temperature sensing means which may take the form of a heat conductive casing in good heat conducting contact with both of said enclosures and adapted to be positioned in good heat conducting relationship with a wall surface.

A more specific object of the invention is to provide an improved temperature responsive circuit controlling device of the character described wherein the contact enclosures take the form of hermetically sealed thermally expansible and contractible bellows each having a sub-atmospheric volatile fluid fill therein providing fail-safe operation, there being adjustable biasing means associated with each of said bellows for varying the temperature control point of the contacts therein.

Other and further objects and advantages of the invention will become apparent from the following detailed description taken in connection with the accompanying drawings showing two forms of the invention, and wherein like characters of reference indicate the same parts in the several views.

Figure 3:
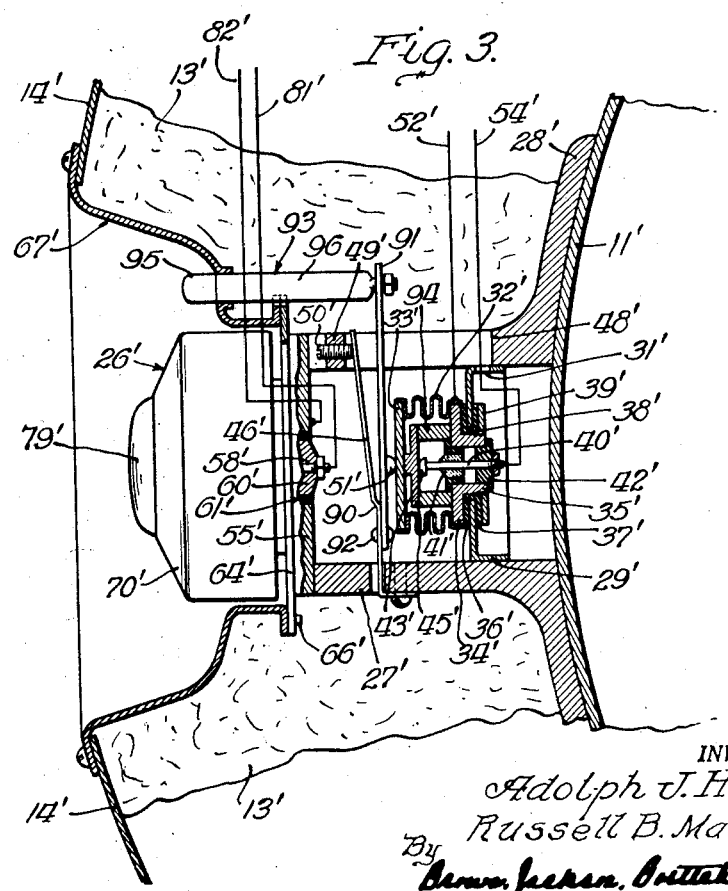
Figure 2:
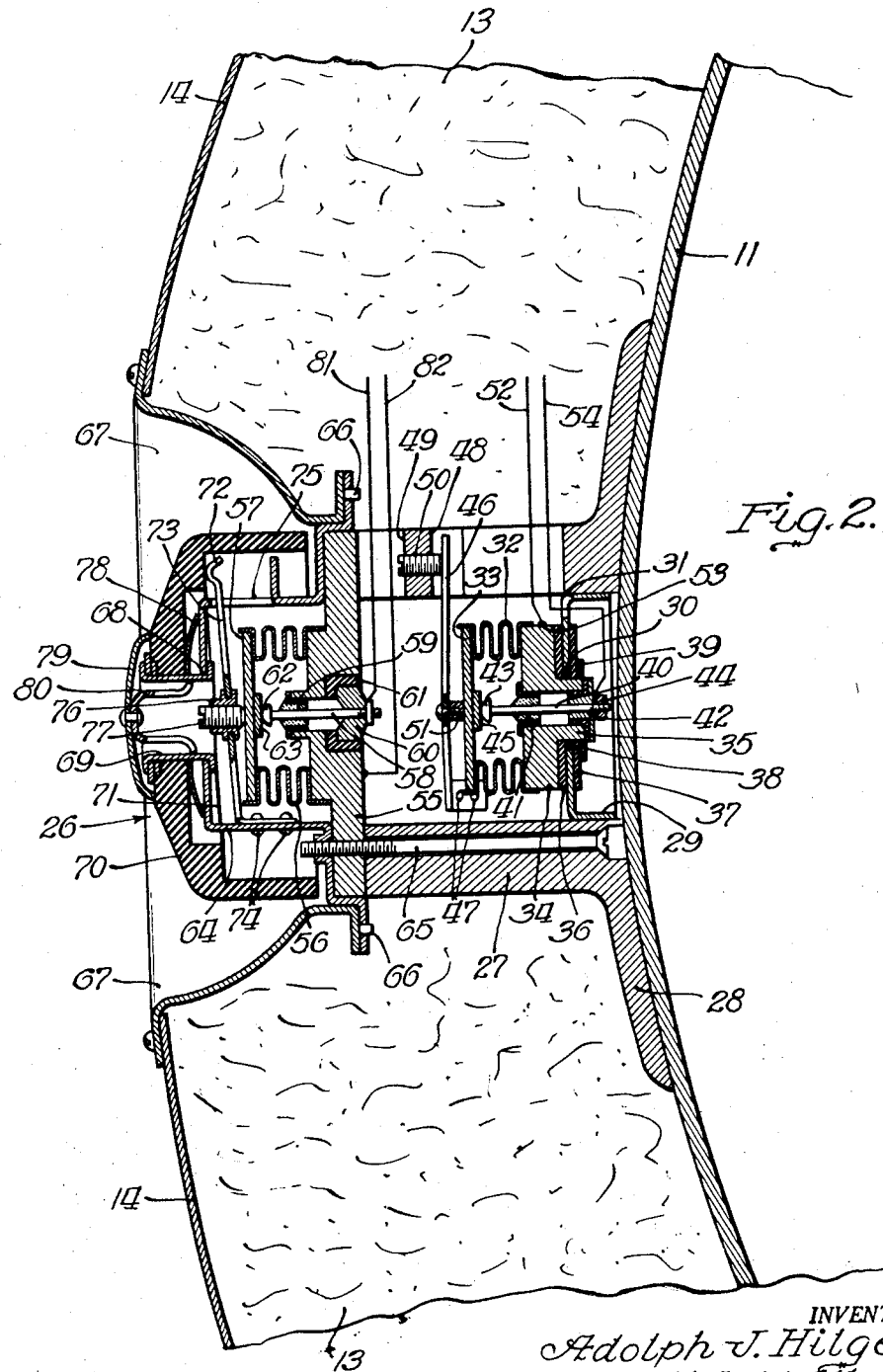

In the drawings:

Figure 1 is a diagrammatic fragmentary elevational view of the improved fuel control apparatus as applied to a water heater;

Figure 2 is an enlarged fragmentary sectional plan view taken approximately along the line 2—2 of Figure 1 and showing the structural details of one form of the improved circuit controlling device which may be utilized in the improved fuel control apparatus; and, Figure 3 is a view similar to Figure 2 showing another form of improved circuit controlling device for use in the improved fuel control apparatus.

Referring more particularly to Figure 1 of the drawings, the form of the invention selected for illustration is shown associated with a fluid fuel burning water heater 10 having a metal storage tank 11 in which water is heated by heat from a main fuel burner 12 therebelow. The tank 11 is preferably encased in an insulating jacket 13 having a metal outer shell 14. An ignition or pilot burner 15 is mounted adjacent the main burner 12, and a thermoelectric generator 16 of any suitable type is mounted adjacent the pilot burner and remote from the main burner. The pilot burner 15 directs a flame toward the main burner and also directs a flame at the hot junction of the thermoelectric generator as shown.

Fluid fuel is delivered to the main burner 12 through a fuel supply line 17 which has interposed therein a pair of electromagnetically operated valves 18 and 19. A pilot burner fuel supply line 20 extends from the valve 19 to the pilot burner 15 as shown. The valve 18 is preferably of the direct-acting or cycling type shown and described in the copending application for patent of Adolph J. Hilgert and Russell B. Matthews, Serial No. 289,242, filed May 22, 1952, now Patent No. 2,717,123. The structure of the valve 18 will not be described in detail herein, it being sufficient to state, for the purposes of this application, that said valve has an electromagnetic operator 21 provided with terminals 22 and 23 for connection into a thermoelectric circuit, the operator 21 opens the valve 18 upon energization by a thermoelectric current and closes said valve when the flow of thermoelectric current thereto is interrupted, as will be hereinafter more fully described.

The valve 19 is connected into the fuel supply line 17 ahead of the valve 18 and is preferably of the manually resettable type which when closed shuts off the flow of fuel to both the main burner 12 and the pilot burner 15, thus providing 100 percent shut-off. Henry J. Alfery, Patent Number 2,296,322, dated September 22, 1942, shows and describes a valve of this type. Suffice it to state for the purpose of this application that valve 19 has an electromagnet (not shown) therein having one terminal grounded to the valve body, and having a terminal 24 for connection in the thermoelectric circuit. A manual reset button 25 is provided for initially opening the valve 19. The electromagnet in the valve 19 holds the latter open as long as said electromagnet is energized by thermoelectric current. When the flow of said current is interrupted, the valve closes and remains closed until subsequently opened by actuation of the reset button 25.

A surface type temperature responsive circuit controlling device 26 is mounted on the external wall surface of the tank 11. Referring to Figure 2, the device 26 may include a tubular frame or casing 27 having one end formed with an outwardly directed annular contact flange 28 which is shaped to fit the contour of the tank 11 and to provide maximum surface contact therewith. The casing 27 and its flange 28 are made of materials having good heat conducting characteristics, said casing being fixed to the tank in good heat conducting relationship therewith.

A cup-shaped mounting bracket 29 having a central aperture 30 and a peripheral aperture 31 is press-fitted or otherwise suitably fixed in good heat conducting relation within the end of the casing 27 adjacent the flange 28. A hermetically sealed expansible and contractible enclosure in the form of a bellows 32 is closed at one end by a movable end wall 33 and at the opposite end by a centrally apertured fixed wall 34 having a tubular extension 35 projecting through the aperture 30 in the bracket 29. The wall 34 is made of material having good heat conducting properties, for example metal. A pair of electrically insulating washers 36 and 37 surround the extension 35 on opposite sides of the bracket 29, and an electrically insulating washer 38 surrounds the extension 35 within the aperture 30. A securing member 39 is fixed, as by threading, on the end of the tubular extension 35 and holds the hollow end wall 34 and washers 36 to 38 in snugly fitting assembled relationship with the bracket 29. The material from which the washers 36 to 38 are made not only has electrically insulating characteristics, but it also has good heat conductivity characteristics. Thus, the wall 34 is in good heat conducting relationship with the bracket 29, casing 27, and the surface of the tank 11.

A contact stem 40 projects through the central aperture and tubular extension of the fixed wall 34 and is insulated therefrom by a glass seal 41 and an insulator 42. The inner end of the stem 40 is provided with a rounded contact tip 43 forming one of the contacts of the bellows 32, and the outer end of said stem is provided with suitable means for effecting a low resistance connection therewith, such as a nut 44. A flat contact member 45 is coaxially fixed to the inner surface of the movable wall 33 and coacts with the tip 43.

A spring lever 46 is fixed to the inner wall surface of the casing 27, as by rivets 47, and projects transversely into an aperture 48 formed in a sidewall portion of the casing 27. The casing 27 is also formed with an opening 49 adjacent the aperture 48, and the wall portion therebetween is bored to threadedly receive a factory range adjustment screw 50 which coacts with the spring lever 46. The spring lever 46 carries a lug 51 coaxial with the movable wall 33 and engaging the latter. The bias of the spring lever 46 tends to hold the contact 45 in engagement with the contact 43 to provide a low resistance connection therebetween. An insulated conductor 52 is electrically connected to the fixed wall 34 as at 53, and an insulated conductor 54 is electrically connected to the stem 40 at nut 44, said conductors projecting from the casing 27 through the aperture 48.

The outer end of the tubular casing 27 is closed by a centrally apertured wall 55 which provides a fixed base plate for a hermetically sealed expansible and contractible bellows 56 having an opposite movable end wall 57. The wall 55 is made of material having good heat conducting characteristics, for example, metal, and is in good heat conducting contact with the casing 27. A contact stem 58 projects through the central aperture of the base plate 55 and is electrically insulated from said plate by a glass insulator 59, said stem having a terminal tip 60 insulated from the plate 55 by an insulator 61. The stem 58 has a rounded inner end 62 forming one of the contacts of the bellows 56. A flat contact 63 is fixed coaxially to the inner surface of the movable end wall 57 and coacts with the contact 62.

A bracket 64 has a generally U-shaped intermediate portion which straddles the bellows 56 in generally diametrical relation. The bracket 64 and the base plate 55 may be fixedly connected to the casing 27 by screws, such as the screw 65 extending through suitable bores in said casing and base plate and threaded into suitable bores in said bracket. The outer ends of the bracket 64 are apertured to receive pins 66 carried by an annular funnel-shaped bezel 67, the outer edges of which may overlap the jacket shell 14 as shown.

The bracket 64 has an aperture 68 coaxial with the bellows wall 57, and fixed in said aperture is a bearing sleeve 69. A dial or temperature adjusting knob 70 is rotatably mounted on the bearing sleeve 69 and has an annular cam surface 71 which is inclined and cooperates with the free end 72 of a spring lever 73 which extends diametrically across the movable end wall 57. The opposite end of the lever 73 is fixed to the bracket 64 as by rivets 74. The bracket 64 has an opening 75 through which the lever 73 projects.

The spring lever 73 is apertured to receive a sleeve 76 in which a factory range adjustment screw 77 is threaded, the latter coaxially engaging the movable bellows wall 57. A spring washer 78 surrounds the bearing sleeve 69 and is interposed between the knob 70 and the bracket 64. A removable convex cap 79 closes the outer end of the bearing sleeve 69 and is provided with a friction clip 80 for engagement with the inner wall surface of the sleeve 69. Removal of the cap 79 permits access to the adjustment screw 77 through the sleeve 69. An insulated conductor 81 is electrically connected to the contact tip 60, and a conductor 82 is electrically connected to the base plate 55, both of said conductors projecting through the opening 49 in the casing 27 as shown.

The bellows 32 and the bellows 56 are both filled with a volatile fluid whose vapor pressure increases and decreases upon rise and fall in temperature. The preferred fill for water heater applications is normal propyl alcohol having a boiling point of 207° F. Since the high limit setting of water heater safety devices is usually less than 207° F., normal propyl alcohol provides a subatmospheric fill. Thus, in case either bellows leaks, the leaking bellows will expand and interrupt the thermoelectric circuit through its contacts.

When the invention is used in application other than water heaters or it is desired to operate in a different temperature range, a fill suitable for the particular range is used. The copending application for patent of John A. Wolff, Serial No. 266,626, filed January 16, 1952, now Patent No. 2,719,202, and the copending application for patent of Adolph J. Hilgert, Serial No. 291,047, filed May 31, 1952, now Patent No. 2,724,030, list a number of subatmospheric bellows fills which are suitable for use in different temperature ranges.

Referring now to Figure 1, the thermoelectric generator 16 has a lead comprising a pair of conductors 83 and 84, the latter being grounded to the body of the valve 18 through a conductor 85 and also being grounded to the body of the shut-off valve 19 as shown. The conductor 82, which is connected in circuit with the transverse wall 55, and hence is grounded to the casing 27 and to tank 11, is connected to the conductor 84, as at 86. The conductor 83 is connected in circuit with the terminal 23 of the electromagnetic valve operator 21 and is also connected in circuit with the conductor 54, as at 87. The conductor 52 is connected in circuit with the terminal 24 of the electromagnet of the shut-off valve 19.

It is thus apparent that the valve operator 21 is connected in series circuit relation with the contacts 62 and 63 in the bellows 56, and that the electromagnet of the shut-off valve 19 is connected in series circuit relation with the contacts 43 and 45 in the bellows 32. It is also apparent that the serially connected operator 21 and contacts 62 and 63, and the serially connected electromagnet of valve 19 and the contacts 43 and 45 are connected in parallel circuit relation to the thermoelectric generator 16.

Due to the fact that the casing 27 and its flange 28 are in good heat conducting contact with the tank 11 and are made of material having good heat conductivity, said casing senses the temperature of the wall surface of the tank and readily conducts heat between said surface and the wall 55 of bellows 56. Similarly the casing readily conducts heat between said wall surface and the bracket 29 of the bellows 32, which bracket, as previously mentioned, is in good heat conducting relationship with the wall 34 of bellows 32. Thus, the casing 27 provides a temperature sensing means common to both bellows.

The improved circuit controlling device 26, with its sets of contacts encapsulated within hermetically sealed bellows and immersed in a volatile fill, provides slow-make, slow-break contacts which may function as a variable resistance in the thermoelectric circuit, since in view of the small electric energy involved in the thermoelectric circuit, the valves 18 and 19 may be actuated in response to temperature changes by varying the contact pressure between the encapsulated contacts in said circuit.

The electromagnetic valve operator 21 inherently has a differential between its pick-up and drop-out current values, and this differential is dependent solely on the electrical constants of the apparatus, that is, the pick-up and drop-out current values of the operator 21 in relation to the contact pressure and hence electrical resistance between the contacts 62 and 63 in circuit therewith. The temperature differential required to produce pick-up or drop-out resistance at the contacts is on the order of a few tenths of a degree. This is much smaller than the differential of conventional thermostats, and is so small that in spite of the normal thermal lag inherent in a surface type thermostat, the sensitivity of the improved thermostat is greater than that of conventional immersion type thermostats. Since the contacts 62 and 63 are encapsulated, and the resistance therebetween remains constant for a given contact pressure, the improved thermostat retains its high degree of sensitivity throughout its life. There is no snap-acting means or friction producing mechanism to contribute to the differential of the device.

The encapsulation of the contacts within a bellows and immersion in a volatile fluid fill protects said contacts from dust and other foreign matter and also prevents film formation on or corrosion of said contacts, so that actuation of the electromagnetic operator 21 by a thermoelectric circuit is possible. On the other hand, the low voltage circuit makes possible the use of a volatile fill in the bellows, since arcing at the contacts, which would break down a volatile fill, is eliminated. Encapsulation of the contacts in the manner described also assures constant resistance for a given contact pressure as aforementioned.

When the temperature of the water in the tank 11, as sensed by the casing 27 and its flange 28, falls below that set by the cooperation of the cam surface 71 with the spring lever 73 at the position to which the knob 70 is turned for the desired setting, the fill in the bellows 56 contracts and permits said bellows to contract under the influence of the spring lever 73. The contact 63 gradually closes against the contact 62 and the contact pressure therebetween builds up, for example from about zero pounds pressure to at least the pressure at which the resistance between said contacts is sufficiently low to permit enough thermoelectric current to flow to the electromagnetic valve operator 21 to energize the latter and open the valve 18. Opening the valve 18 delivers fuel to the main burner, which fuel is ignited by the flame of the pilot burner 15 and heats the tank 11 and the water therein.

A rise in the water temperature above that set by the knob 70 and the cooperation of the spring lever 73 with the cam surface 71, expands the fill in the bellows 56 and causes said bellows to expand. A rise of a few tenths of a degree Fahrenheit above the mentioned setting causes expansion of bellows 56 sufficient to reduce said contact pressure and hence increase the contact resistance between the contacts 62 and 63 to a point where the thermoelectric current flowing therethrough is insufficient to maintain the electromagnetic operator 21 energized. The valve 18 is then actuated to closed position and the main burner is shut off. It is apparent, therefore, that the valve 21 is actuated to open and closed positions by the improved circuit controlling device 26 in response to variations in temperature of the water in the tank 11 as sensed by the casing 27 of said device.

If for any reason the temperature of the water in the tank 11 rises above that set by the cooperation of the adjustment screw 50 with the spring arm 46, the fill in the bellows 32 expands, expanding said bellows against the bias of said spring arm. This reduces the contact pressure and increases the contact resistance between the contacts 45 and 43 to the point where the thermoelectric current flowing therethrough to the electromagnet of shut-off valve 19 is insufficient to maintain said electromagnet energized. The valve 19 is then actuated to closed position and shuts off the flow of fuel to both the main burner 12 and the pilot burner 15, providing 100 percent shut-off of the fuel. The valve 19 stays shut until manually reset.

If, during operation of the improved apparatus, the flame of the pilot burner 15, which should normally burn constantly, becomes extinguished and thereby creates an unsafe condition, the thermocouple 16 cools and the flow of thermoelectric current to the operator 21 and to valve 19 stops. When this occurs, both of said valves close, even though closure of valve 19 by itself provides 100 percent shut-off of the fuel. Subsequent depression of the reset button 25 of valve 19 permits fuel flow to the pilot burner, allowing safe lighting of the latter while the closed valve 18 prevents fuel flow to the main burner 12. After the pilot burner is re-ignited and the circuit controlling device 26 calls for heat, the operator 21 automatically opens the valve 18 to permit fuel flow to the main burner 12.

The inherently small differential of the improved circuit controlling device 26, and the small thermal lag of the temperature responsive bellows, together with the efficient heat transfer provided by the casing 27 provides said device with greater sensitivity than is provided by conventional immersion type circuit controlling devices. The unitary nature of the device 26, combined with the fact that it is adapted for surface mounting, makes for simplicity of installation, and the fact that the device does not come in contact with the water in the tank avoids such problems as electrolysis and corrosion to which immersion type units are subjected.

A modified form of circuit controlling device 26' is shown in Figure 3. The modified form of Figure 3 is similar in many respects to the form of Figure 2, and the parts indicated by primed reference numerals in Figure 3 correspond to similar parts indicated in Figure 2 by the same numerals unprimed.

In Figure 3 the spring arm 46' is formed with an offset portion 90, and the end of a rigid arm 91 is fixed to said spring arm, as by a rivet 92. The arm 91 projects through the casing opening 48' and is connected to an axially slidably mounted pin or button 93 which projects through a suitable aperture in the bezel 67'. The portion of the pin 93 which normally projects outwardly of the bezel 67' and is indicated by the numeral 95 may be colored one color, and the portion normally concealed behind said bezel and indicated by the numeral 96 may be colored a contrasting color. The arm 91 carries a lug 51' which coaxially engages the movable wall 35' of the bellows 32'.

A permanent magnet 94 is mounted within the bellows 32' and is fixed to the fixed wall 34'. A flat contact member 45' of magnetic material is fixed coaxially to the movable wall 33' within the bellows 32' and coacts with the contact 43'. The contact 45' may be plated with a metal, such as silver, having good electrical conducting properties. The bellows 32' has an inherent spring force or bias tending to move the wall 33' and contact 45' to the left as viewed in Figure 3. The spring arm 46', on the other hand, acting through the rigid arm 91 and its lug 51', opposes the spring force of the bellows 32, but is insufficient, by itself, to cause movement of the wall 33' and contact 45' to the right against the spring action of the bellows 32'. As in the previous embodiment of the invention, the bellows 32' is preferably filled with a suitable volatile sub-atmospheric fluid fill, such as normal propyl alcohol.

The contacts 43' and 45' are initially set into engagement by manually depressing of the pin 93 to swing the arm 91 to the right (Figure 3) and compress the bellows 32' by moving the wall 33' and contact 45' to the right. When the contact 45' is in engagement with the contact 43', it is also positioned close to the magnet 94 and is attracted thereby with sufficient force so that upon release of the pin 93, the force of magnetic attraction plus the force exerted by the spring arm 46', acting on the wall 33' through the rigid arm 91 and its lug 51', is sufficient to normally hold the contacts in engagement against the spring force of the bellows 32'.

If for any reason the temperature of the water in the tank 11', as sensed by the casing 27', rises above that set by the cooperation of the range adjustment screw 50' with the spring arm 46', the vapor pressure of the fill in the bellows 32' expands said bellows and snaps the contact 45' away from the contact 43' and away from the magnet 94 to a drop-out position where the attractive force of the magnet on the contact 45' is greatly reduced. Disengagement of the contacts 43' and 45' interrupts the flow of thermoelectric current to the electromagnet of the shut-off valve 19 (Figure 1), and said valve closes, providing 100 percent shut-off of the fuel. The movable wall 33', of course, moves with the contact 45' and swings the rigid arm 91 to the left, as viewed in Figure 3, thereby projecting the pin 93 axially outwardly to a drop-out indicating position wherein the contrasting color of the portion 96 of said pin is visible outwardly of the bezel 69'.

This indicating feature is of particular value in the servicing of the improved fuel control apparatus. For example, when a water heater equipped with the improved circuit controlling device 26' stops functioning, the serviceman can tell immediately, by inspection of the position of the pin 93, whether or not the shut-off has occurred as a result of overheating. If overheating is not indicated, the serviceman then checks the pilot burner, since pilot failure is a likely cause of the shut-off condition. Much service time is thus saved by the improved indicating feature.

Due to the fact that the magnet 94 has little attractive effect on the contact 45' when the latter is in drop-out position, the biasing force of the spring arm 46' is insufficient to reset the contact 45' into engagement with the contact 43', even after the temperature of the water in the tank has cooled considerably below the high limit setting of the device 26'. Contact 45' may be manually reset to its normal position in engagement with the contact 43' by depression of the pin 93, which depression swings the rigid arm 91 to the right (in Figure 3), and compresses the bellows 32' by moving the wall 33' thereof to the right. The reset contact 45' is again attracted by the magnet 94 with substantial force and it remains in its normal position until dropped-out by subsequent overheating. Depression of the reset button 25 of valve 19 permits safe lighting of the pilot burner, and upon heating up of the thermoelectric generator 16 the operator 21 opens the valve 18 if the device 26' calls for heat, thus permitting fuel flow to the main burner. Thus, the improved fuel control apparatus is again operative.

The embodiments of the invention selected for illustration are not to be construed as a definition of the limits or scope of the invention. Various other changes and modification may be made without departing from the spirit of the invention, and all of such changes are contemplated as may come within the scope of the claims.

What I claim as the invention is:

1. A resettable condition responsive circuit controlling device, comprising: a hermetically sealed enclosure expansible and contractible in response to changes in condition; cooperating contacts carried by and encapsulated within said enclosure, said enclosure normally biasing said contacts toward a first position, said contacts being movable for resetting against the bias of said enclosure to a second position; and releasable magnetic latching means within said enclosure for holding said contacts in said second position when reset thereto, said enclosure being expansible in response to a predetermined change in condition to release said latching means and move said contacts to said first position pending subsequent resetting.

2. A resettable condition responsive circuit controlling device, comprising: a hermetically sealed enclosure expansible and contractible in response to changes in condition; cooperating contacts carried by and encapsulated within said enclosure, said enclosure normally biasing said contacts toward a circuit interrupting drop-out position, said contacts being movable for resetting against the bias of said enclosure to an engaged position, and one of said contacts being made of magnetically permeable material; and a permanent magnet fixed within said enclosure, said permeable contact being juxtaposed to and attracted by said magnet to be held thereby in engagement with the other contact when said contacts are reset to said engaged position, said enclosure being expansible in response to a predetermined change in condition to move said contacts to said drop-out position where the attractive force of the magnet on said first contact is substantially reduced.

3. A resettable condition responsive circuit controlling device, comprising: a hermetically sealed enclosure expansible and contractible in response to changes in condition; cooperating contacts carried by and encapsulated within said enclosure, said enclosure normally biasing said contacts toward a circuit interrupting drop-out position, said contacts being movable for resetting against the bias of said enclosure to an engaged position; releasable magnetic latching means within said enclosure for holding said contacts in said engaged position when reset thereto, said enclosure being expansible in response to a predetermined change in condition to release said latching means and move said contacts to said drop-out position; and a manually resettable movably mounted indicating member positioned for actuation by said enclosure from a normal position to a drop-out indicating position in response to said predetermined change in condition.

4. A resettable thermostatic switch comprising: contact means including relatively movable cooperating contact members biased toward separated relation and movable against said bias into engagement, said contact means also including releasable magnetic means for holding the contact members in engagement when moved thereto against said bias; temperature responsive actuating means for effecting release of said holding means and movement of said contact members to separated relation in response to a predetermined change in the temperature; said actuating means being incapable of returning said contacts to engaged position against said bias in response to an opposite change in the temperature; and means for resetting said contact members into engagement after movement thereof to separated relation.

5. A resettable high limit thermostatic switch comprising: contact means including relatively movable cooperating contact members biased toward separated relation and movable against said bias into engagement, said contact means also including releasable magnetic means for holding said contact members in engagement when moved thereto against said bias; temperature responsive actuating means for effecting release of said holding means and movement of said contact members to separated relation in response to a predetermined high limit temperature, said actuating means being incapable of returning said contacts to engaged position against said bias in response to a moderation of the temperature; and means for resetting said contact members into engagement after movement thereof to separated relation, said means comprising a manually engageable reset and indicator member movable to an indicating position on movement of said contacts to said released position in response to said high limit temperature.

6. A condition responsive circuit controlling device, comprising: A first hermetically sealed enclosure expansible and contractible in response to normal fluctuations in the condition; cooperating contacts relatively movable with expansion and contraction of said enclosure; a second hermetically sealed condition responsive expansible and contractible enclosure; relatively movable contact means operatively coacting with said second enclosure and including releasable magnetic means for holding said contact means in a first position when moved thereto, said holding means being released and said contact means being movable to a second position by expansion of said second enclosure in response to a predetermined extreme in the condition; and a common condition sensing element for both of said enclosures.

7. A temperature responsive circuit controlling device, comprising: A first hermetically sealed enclosure expansible and contractible in response to normal fluctuations in the temperature; cooperating contacts relatively movable with expansion and contraction of said enclosure; a second hermetically sealed temperature responsive expansible and contractible enclosure; relatively movable contact means operatively coacting with said second enclosure and including releasable magnetic means for holding said contact means in a first position when moved thereto, said holding means being released and said contact means being movable to a second position by expansion of said second enclosure in response to a predetermined extreme in the temperature; and a common heat conductive temperature sensing element in heat conductive relation to both of said enclosures.

8. A surface type dual thermostat comprising a support of material having relatively high thermal conductivity, said support having a portion adapted to be placed in heat conductive engagement with a surface to the temperature of which said thermostat is to be responsive, a first temperature responsive circuit controlling device mounted on said support in heat conductive relation therewith, said device being calibrated for response to normal fluctuations in the temperature at said surface sensed through said heat conductive support, and a second temperature responsive circuit controlling device also mounted on said support in heat conductive relation therewith, said second temperature responsive device being calibrated for response to excessive temperatures at said surface sensed through said head conductive support.

9. A surface type dual thermostat comprising a tubular support of material having relatively high thermal conductivity, said support having an enlarged flange portion adapted to be placed in heat conductive engagement with a surface to the temperature of which said thermostat is to be responsive, a first temperature responsive circuit controlling device coaxially mounted on said support in heat conductive relation therewith, said device being calibrated for response to normal fluctuations in the temperature at said surface sensed through said heat conductive support, and a second temperature responsive circuit controlling device also coaxially mounted on said support in heat conductive relation therewith, said second temperature responsive device being operable independent of said first temperature responsive device and being calibrated for response to excessive temperatures at said surface sensed through said heat conductive support.

10. A surface type dual thermostat comprising a tubular support of material having relatively high thermal conductivity, said support having an inner end portion adapted to be placed in heat conductive engagement with a surface to the temperature of which said thermostat is to be responsive, a first temperature responsive circuit controlling device closing the outer end of said tubular support and in heat conductive relation therewith, said device being calibrated for response to normal fluctuations in the temperature at said surface sensed through said heat conductive support, and a second temperature responsive circuit controlling device mounted within said tubular support and also in heat conductive relation therewith, said second temperature responsive device being operable independent of said first temperature responsive device and being calibrated for response to excessive temperatures at said surface sensed through said head conductive support.

11. A surface type dual thermostat comprising a tubular support of material having relatively high thermal conductivity, said support having an inner end portion adapted to be placed in heat conductive engagement with a surface to the temperature of which said thermostat is to be responsive, a first temperature responsive circuit controlling device closing the outer end of said tubular support and in heat conductive relation therewith, said device being calibrated for response to normal fluctuations in the temperature at said surface sensed through said heat conductive support, manually engageable control point adjustment means for said first circuit controlling device, and a second temperature responsive circuit controlling device mounted within said tubular support and also in heat conductive relation therewith, said second temperature responsive device being operable independent of said first temperature responsive device and being calibrated for response to excessive temperatures at said surface sensed through said head conductive support.

12. A surface type dual thermostat comprising a tubular support of material having relatively high thermal conductivity, said support having an enlarged flanged inner end portion adapted to be placed in heat conductive engagement with a surface to the temperature of which said thermostat is to be responsive, a first temperature responsive circuit controlling device comprising a temperature responsive expansible and contractible enclosure closing the outer end of said tubular support and having a wall portion in heat conductive relation therewith, said device being calibrated for response to normal fluctuations in the temperature at said surface sensed through said heat conductive support, manually engageable control point adjustment means for said first circuit controlling device, and a second temperature responsive circuit controlling device comprising a temperature responsive expansible and contractible enclosure mounted coaxially within said tubular support and also having a wall portion in heat conductive relation therewith, said second temperature responsive device being operable independent of said first temperature responsive device and being calibrated for response to excessive temperatures at said surface sensed through said heat conductive support.

13. A surface type dual thermostat comprising a support of material having relatively high thermal conductivity, said support having a portion adapted to be placed in heat conductive engagement with a surface to the temperature of which said thermostat is to be responsive, a first temperature responsive circuit controlling device mounted on said support in heat conductive relation therewith, said device being calibrated for response to normal fluctuations in the temperature at said surface sensed through said heat conductive support, and a second temperature responsive circuit controlling device also mounted on said support in heat conductive relation therewith, said device comprising relatively movable contact means and releasable means for holding said contact means in a first position when moved thereto, said second temperature responsive device being operable independent of said first temperature responsive device and being calibrated for response to excessive temperatures at said surface sensed through said heat conductive support to effect release of said holding means and movement of said contact means to a second position.

14. A surface type dual thermostat comprising a support of material having relatively high thermal conductivity, said support having a portion adapted to be placed in heat conductive engagement with a surface to the temperature of which said thermostat is to be responsive, a first temperature responsive circuit controlling device mounted on said support in heat conductive relation therewith, said device being calibrated for response to normal fluctuations in the temperature at said surface sensed through said heat conductive support, a second temperature responsive circuit controlling device also mounted on said support in heat conductive relation therewith, said device comprising relatively movable contact means and releasable magnetic means for holding said contact means in a first position when moved thereto, said second temperature responsive device being calibrated for response to excessive temperatures at said surface sensed through said heat conductive support to effect release of said holding means and movement of said contact means to a second position, and a manually engageable reset and indicator member movable to an indicating position on movement of said contact means to said second position.

References Cited in the file of this patent

UNITED STATES PATENTS

| Number | Name | Date |
|---|---|---|
| 243,345 | Lungen | June 21, 1881 |
| 1,265,765 | Ferris | May 14, 1918 |
| 1,678,885 | Thomas | July 31, 1928 |
| 1,735,268 | Ellis | Nov. 12, 1929 |
| 1,934,548 | Kellogg | Nov. 7, 1933 |
| 1,952,571 | Smith | Mar. 27, 1934 |
| 1,959,591 | Lowe | May 22, 1934 |
| 2,007,714 | Gauger | July 9, 1935 |
| 2,032,136 | Lee | Feb. 25, 1936 |
| 2,037,142 | Newell | Apr. 14, 1936 |
| 2,096,502 | Wetzel | Oct. 19, 1937 |
| 2,296,322 | Alfrey | Sept. 22, 1942 |
| 2,312,479 | Ray | Mar. 2, 1943 |
| 2,312,547 | Hildebrecht | Mar. 2, 1943 |
| 2,455,542 | Weber et al. | Dec. 7, 1948 |
| 2,483,298 | Newman | Sept. 27, 1949 |
| 2,516,504 | Cerny et al. | July 25, 1950 |
| 2,717,123 | Hilgert | Sept. 6, 1955 |
| 2,717,381 | Matthews | Sept. 6, 1955 |
| 2,719,202 | Wolff | Sept. 27, 1955 |
| 2,752,457 | Matthews | June 26, 1956 |